Nov. 17, 1959   G. W. BRODEN   2,912,765
TOOL BIT MICROMETER
Filed Dec. 27, 1956
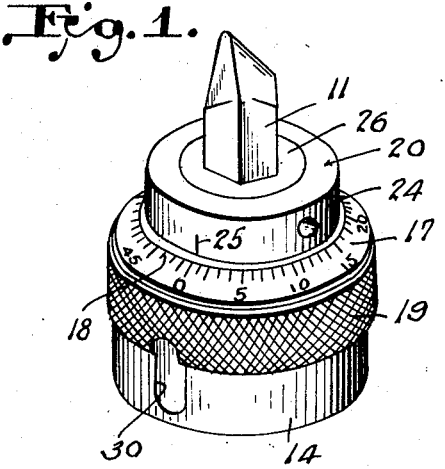
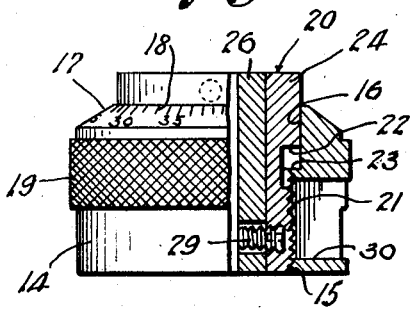
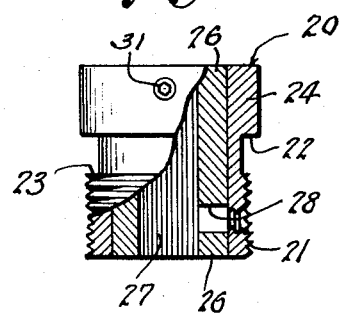
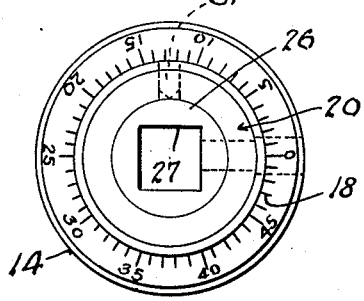
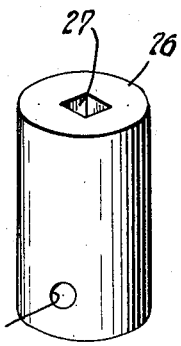
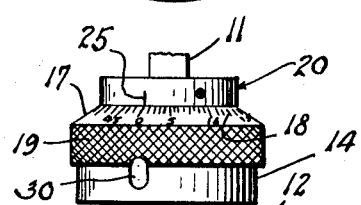
Gustaf W. Broden
INVENTOR
BY *C. A. Snow & Co.*
ATTORNEYS.

United States Patent Office 2,912,765
Patented Nov. 17, 1959

2,912,765

TOOL BIT MICROMETER

Gustaf W. Broden, Detroit, Mich.

Application December 27, 1956, Serial No. 630,875

1 Claim. (Cl. 33—185)

This invention relates to a tool bit micrometer, and is an improvement over the structure embodied in my prior Patent No. 2,730,810, dated January 17, 1956, for Tool Bit Micrometer.

In a boring operation the cutting bit is secured in a boring bar, and when the machine has been set, the first cut is what is termed a roughing cut. The roughing cut will provide a bore which is of a diameter quite close to the finished diameter. It is, therefore, an object of this invention to provide a tool which is mounted on the cutting bit after the first or roughing cut has been made so that the cutting bit can be adjusted so the desired degree for making the final or finishing cut.

Another object of this invention is to provide a bit adjusting means which can be used with bits of various sizes and different cross-sectional shapes, the device contemplating interchangeable inner sleeves which have polygonal bores for receiving bits of different sizes and shapes.

With the foregoing and other objects in view which will appear as the description proceeds, the invention consists of certain novel details of construction and combinations of parts, hereinafter more fully described and pointed out in the claim, it being understood that changes may be made in the construction and arrangement of parts without departing from the spirit of the invention as claimed.

Referring to the drawing:

Figure 1 is a perspective view of a tool bit micrometer constructed according to an embodiment of this invention.

Fig. 2 is a plan view of the device.

Fig. 3 is a detail side elevation partly broken away and in section of the device.

Fig. 4 is a detail side elevation partly in section of the inner surface.

Fig. 5 is a perspective view of the innermost and interchangeable sleeve.

Fig. 6 is a detail side elevation of the device in applied position on a boring bar which is shown in transverse section.

Referring to the drawing, the numeral 10 designates generally a boring bar which has a tool bit or cutter 11 extending right-angularly through an opening 13 formed in the bar 10. The bit or cutter 11 is secured in the opening 13 by means of a set screw 12.

In order to provide a means whereby after the initial roughing cut has been made within the material a finishing cut may be made without changing the position of the boring bar 10, I have provided a micrometer or bit adjusting member which includes an annular body 14. The body 14 is provided with a threaded bore 15 and with a counter bore 16 at its outer end. The outer end of the body 14 is tapered as indicated at 17 and graduations 18 are formed on the tapering surface 17. The body 14 is also provided intermediate the ends thereof with an annular knurled portion 19. An intermediate sleeve generally indicated at 20 is disposed within the body 14 and is provided with an inner externally threaded portion 21 which engages the threads 15 of body 14.

The intermediate sleeve 20 is also formed with a shoulder 22 which is adapted to confront an annular shoulder 23 formed at the outer end of the threads 15. The outer portion 24 of intermediate sleeve 20 is slidably mounted within the counterbore 16 and this outer portion projects outwardly of the body 14 for a short distance. The external peripheral surface of intermediate sleeve 20 is provided with a mark or binder 25 which is co-related with the graduations 18 on tapered end 17 of annular body 14. Interchangeable sleeve 26 is disposed within the intermediate sleeve 20 and interchangeable sleeve 26 is provided with a polygonal bore 27. This bore 27 extends through the length of the interchangeable sleeve 26 and the transverse configuration of bore 27 conforms to the external configuration of bit or cutter 11. In other words, where the bit 11 is square in transverse section the bore 27 will be square, but where the bit 11 is hexagonal or rectangular, the bore 27 will be similar thereto.

The interchangeable sleeve 26 is provided adjacent the inner end thereof with a transversely extending opening 28 which is of a diameter slightly greater than the diameter of a set screw 29 which is threaded transversely through the intermediate sleeve member 20. The set screw 29 provides a means whereby the two sleeves 20 and 26 may be locked relative to the bit or cutter 11, while the body 14 may be rotated about the threads 21 of intermediate sleeve 20. The body 14 is provided with a longitudinally elongated opening 30 which in the zero position of body 14 with respect to intermediate sleeve 20, is disposed in registry with the set screw 29. By providing the opening 28 of a diameter slightly greater than the external diameter of the set screw 29, the opening 28 may be slightly out of registry with the set screw 29 and the latter may nevertheless be extended inwardly through the opening 28.

The inner sleeve 26 is secured against movement relative to the intermediate sleeve 20 by means of a set screw 31 which is threaded through the outer portion 24 of intermediate sleeve 20.

In the use and operation of this tool, after the initial roughing cut has been made by the bit or cutter 11, the body 14 is inserted over the bit 11, as shown in Fig. 6, until the inner end of body 14 and the inner ends of sleeves 20 and 26 bear against the outer surface of boring bar 10. Set screw 12 is then loosened and set screw 29 is threaded inwardly to tightly bear against the bit 11. Body 14 is then rotated clockwise, as viewed in Fig. 1, whereupon intermediate sleeve 20 with interchangeable sleeve 26 will be moved upwardly and outwardly of body 14. When the bit 11 has been moved endwise and at right angles to bar 10 for the desired distance, set screw 12 is then tightened against the bit 11 and set screw 29 is loosened so that the tool may now be removed from the adjusted bit 11.

With a tool of this kind the bit can be reset to its original position for forming the rough cut for reattaching the tool to the bit and then reversing the adjusting procedure until mark 25 is in alignment with the zero graduation 18.

What is claimed is:

In a boring bar having a bit disposed transversely thereof and a first set screw for securing the bit in adjusted position, a micrometer for finely adjusting said bit relative to said bar, said micrometer comprising a cylindrical body having interior threads for a portion of the length thereof and a smooth counterbore extending from the outer end of said threads, an intermediate sleeve in said body, exterior threads carried by said intermediate sleeve engaging said interior threads of said body, said sleeve including a smooth outer portion rotatably engaging said counterbore, said body having a longitudinally elongated opening, a second set screw threaded through said intermediate sleeve, an interchangeable sleeve in said intermediate sleeve, said interchangeable sleeve having a polygonal bore therethrough in which said bit is adapted to engage, said interchangeable sleeve having a transverse opening larger than the outer diameter of said second set screw whereby said set screw may loosely extend therethrough for clamping engagement with said bit, and a third set screw threaded through the outer portion of said intermediate sleeve for tightly securing said interchangeable sleeve relative thereto.

References Cited in the file of this patent

UNITED STATES PATENTS

| | | |
|---|---|---|
| 2,730,810 | Broden | Jan. 17, 1956 |
| 2,775,821 | Eipper et al. | Jan. 1, 1957 |